United States Patent
Isobe et al.

(10) Patent No.: US 11,964,344 B2
(45) Date of Patent: Apr. 23, 2024

(54) GLASS SUBSTRATE HAVING THROUGH HOLE AND HOLLOWED-OUT PORTION AND METHOD FOR PRODUCING THE SAME

(71) Applicant: AGC Inc., Tokyo (JP)

(72) Inventors: Mamoru Isobe, Tokyo (JP); Kohei Horiuchi, Tokyo (JP)

(73) Assignee: AGC Inc., Tokyo (JP)

( * ) Notice: Subject to any disclaimer, the term of this patent is extended or adjusted under 35 U.S.C. 154(b) by 491 days.

(21) Appl. No.: 17/120,717

(22) Filed: Dec. 14, 2020

(65) Prior Publication Data
US 2021/0197320 A1  Jul. 1, 2021

(30) Foreign Application Priority Data
Dec. 26, 2019  (JP) ................................ 2019-237339

(51) Int. Cl.
| | |
|---|---|
| *B23K 26/384* | (2014.01) |
| *B23K 26/0622* | (2014.01) |
| *B23K 26/402* | (2014.01) |
| *B23K 26/50* | (2014.01) |

(Continued)

(52) U.S. Cl.
CPC ........ *B23K 26/384* (2015.10); *B23K 26/0624* (2015.10); *B23K 26/402* (2013.01);
(Continued)

(58) Field of Classification Search
CPC .............. H05K 1/16; H01L 2225/1041; H01L 21/76898; H01L 21/743; H01L 21/768;
(Continued)

(56) References Cited

U.S. PATENT DOCUMENTS

| | | | |
|---|---|---|---|
| 2006/0278995 A1* | 12/2006 | Trezza | H01L 23/481 257/E21.705 |
| 2008/0043210 A1* | 2/2008 | Shibuta | G03F 7/70866 355/30 |

(Continued)

FOREIGN PATENT DOCUMENTS

| | | | | |
|---|---|---|---|---|
| EP | 2940740 A1 * | 11/2015 | ......... | B23K 26/0624 |
| JP | 2011-206838 A | 10/2011 | | |

(Continued)

OTHER PUBLICATIONS

Ravichandran et al., "Low-Cost Non-TSV based 3D Packaging using Glass Panel Embedding (GPE) for Power-efficient, High-Bandwidth Heterogeneous Integration", 2019 IEEE 69$^{th}$ Electronic Components and Technology Conference, 2019, pp. 1796-1802.

*Primary Examiner* — Nathaniel E Wiehe
*Assistant Examiner* — Spencer H. Kirkwood
(74) *Attorney, Agent, or Firm* — Oblon, McClelland, Maier & Neustadt, L.L.P.

(57) ABSTRACT

A glass substrate for a semiconductor package includes a first principal surface, a second principal surface, at least one hollowed-out portion, and at least one through hole formed in a surrounding of the at least one hollowed-out portion, wherein in a section of the at least one hollowed-out portion taken in a direction perpendicular to the first principal surface, a minimum diameter of the at least one hollowed-out portion is smaller than an opening diameter of the at least one hollowed-out portion at each of the first principal surface and the second principal surface.

6 Claims, 11 Drawing Sheets

(51) Int. Cl.
*B23K 103/00* (2006.01)
*C03C 15/00* (2006.01)

(52) U.S. Cl.
CPC .............. *B23K 26/50* (2015.10); *C03C 15/00* (2013.01); *B23K 2103/54* (2018.08)

(58) Field of Classification Search
CPC .. B23K 26/384; B23K 26/0624; B23K 26/50; B23K 26/402; B23K 2103/54; C03C 15/00
See application file for complete search history.

(56) References Cited

U.S. PATENT DOCUMENTS

| | | | |
|---|---|---|---|
| 2008/0157361 A1* | 7/2008 | Wood | H01L 23/481 257/E21.597 |
| 2010/0145547 A1* | 6/2010 | Darabnia | G01K 13/00 374/E7.004 |
| 2015/0166395 A1* | 6/2015 | Marjanovic | C03C 15/00 428/131 |
| 2016/0265570 A1* | 9/2016 | Sabau | B29C 66/0246 |
| 2016/0318122 A1* | 11/2016 | Ota | B23K 26/402 |
| 2020/0159113 A1* | 5/2020 | Gouk | H01L 21/76817 |

FOREIGN PATENT DOCUMENTS

| | | |
|---|---|---|
| JP | 2016-92107 A | 5/2016 |
| JP | 2017-510531 A | 4/2017 |
| JP | 2018-199605 A | 12/2018 |
| WO | WO-2018109049 A1 * | 6/2018 |

* cited by examiner

GLASS SUBSTRATE HAVING THROUGH HOLE AND HOLLOWED-OUT PORTION AND METHOD FOR PRODUCING THE SAME

CROSS-REFERENCE TO RELATED APPLICATION

The present application is based on and claims priority under 35 U.S.C. § 119 to Japanese Patent Application No. 2019-237339, filed Dec. 26, 2019, the entire content of which is incorporated herein by reference in its entirety.

BACKGROUND OF THE INVENTION

1. Field of the Invention

The present disclosure relates to a glass substrate having a through hole and a hollowed-out portion and a method for producing the same.

2. Description of the Related Art

In recent years, stacked semiconductor devices referred to as 2.5D devices and 3D devices in which multiple semiconductor chips are implemented and connected with each other with the use of "interposers", i.e., substrates having through electrodes formed therein, have been developed. Silicon, glass, organic materials, ceramics, and the like are being studied as the materials of the interposers. In particular, glass is excellent in flatness, thermal stability, and electrical insulation.

For example, PTL 1 discloses a technique using laser emission to form through holes for through electrodes in glass for interposers.

Most of such glass interposers are designed to have semiconductor chips arranged on the principal surface of the glass substrate. However, in recent years, it is desired to further reduce the thickness of semiconductor devices and further reduce dielectric loss at high frequencies. Accordingly, NPL 1 suggests a design of an interposer in which semiconductor chips are embedded in recessed portions and through portions (hereinafter collectively referred to as hollowed-out portions) formed in the glass substrate, so that the thickness is reduced and the length of conductive traces are reduced.

CITATION LIST

Patent Literature

[PTL 1] Japanese Translation of PCT Application No. 2017-510531

Non-Patent Literature

[NPL 1] Siddharth Ravichandran et al. 2019, "Low-Cost Non-TSV based 3D Packaging using Glass Panel Embedding (GPE) for Power-efficient, High-Bandwidth Heterogeneous Integration", IEEE 69th Electronic Components and Technology Conference, p 1796-p 1802

SUMMARY OF THE INVENTION

Technical Problem

In such an interposer having semiconductor chips embedded therein, the hollowed-out portion may be filled with a resin material when the semiconductor chip is embedded in the hollowed-out portion. In this case, it is desired to strengthen the bonding between the filling resin material and the glass substrate so that the semiconductor chip does not come off.

In view of the above circumstances, the present disclosure provides a glass substrate for a semiconductor package capable of strengthening the bonding between a filling resin material and a glass substrate and a production method for producing the same.

Solution to Problems

According to an aspect of the present disclosure, provided is a glass substrate for a semiconductor package that includes a first principal surface, a second principal surface, at least one hollowed-out portion, and at least one through hole formed in a surrounding of the at least one hollowed-out portion, wherein in a section of the at least one hollowed-out portion taken in a direction perpendicular to the first principal surface, a minimum diameter of the at least one hollowed-out portion is smaller than an opening diameter of the at least one hollowed-out portion at each of the first principal surface and the second principal surface.

Advantageous Effects of Invention

With the use of the glass substrate for the semiconductor package according to the present disclosure, a semiconductor package in which the filling resin material does not come off from the hollowed-out portion can be produced. In addition, according to the production method of the present disclosure, a glass substrate for the semiconductor package can be produced.

DETAILED DESCRIPTION OF THE PREFERRED EMBODIMENTS (Glass Substrate for Semiconductor Package According to First Embodiment)

A glass substrate for a semiconductor package includes a first principal surface, a second principal surface, at least one hollowed-out portion, and at least one through hole formed in a surrounding of the at least one hollowed-out portion, wherein in a section of the at least one hollowed-out portion taken in a direction perpendicular to the first principal surface, a minimum diameter of the at least one hollowed-out portion is smaller than an opening diameter of the at least one hollowed-out portion at each of the first principal surface and the second principal surface. Hereinafter, the detailed configuration is explained with reference to FIG. 1.

Figure 1:
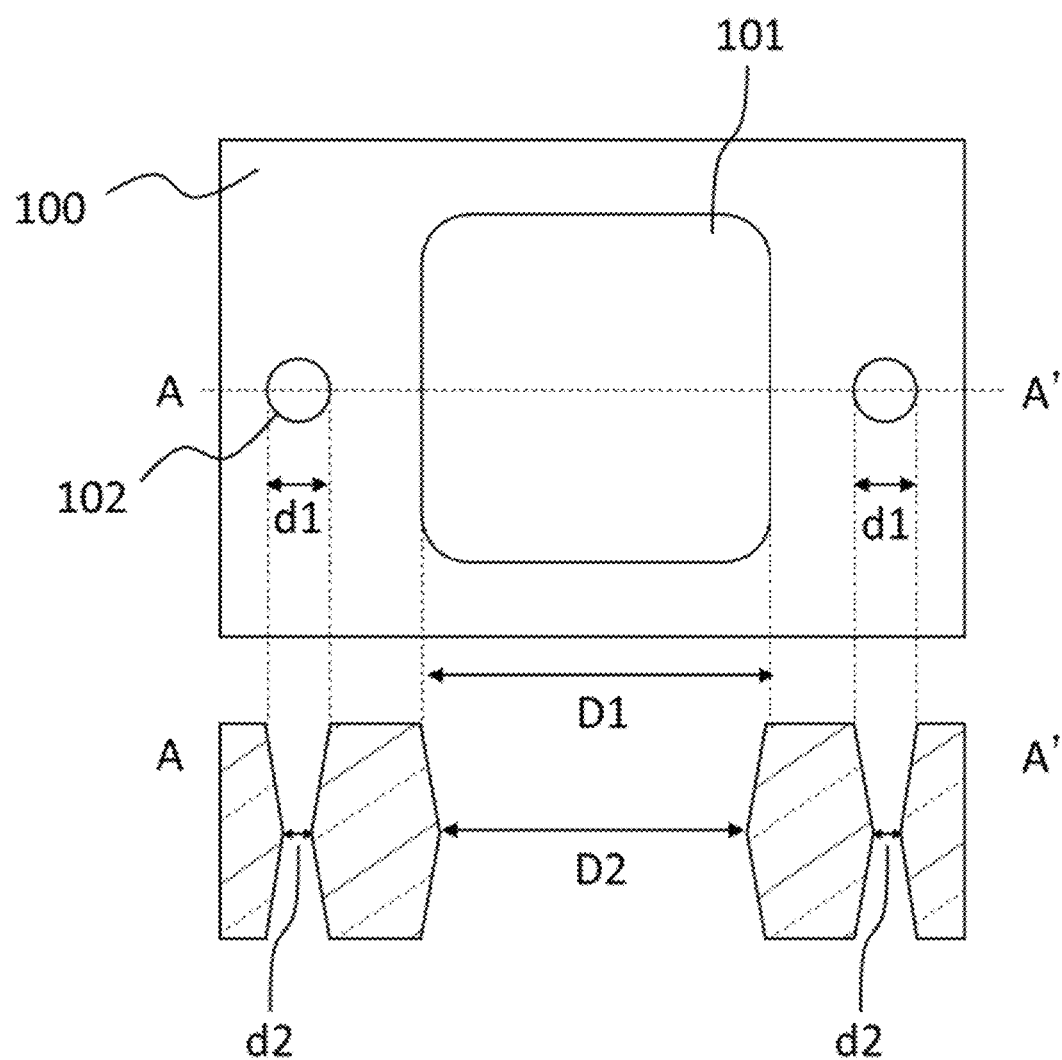
FIG. 1 is a drawing including a plan view and a cross-sectional view of a glass substrate for a semiconductor package according to a first embodiment.

FIG. 1 is a drawing including a plan view illustrating a first principal surface of a glass substrate 100 for a semiconductor package and a cross-sectional view taken along line AA' in the plan view. As illustrated in FIG. 1, the glass substrate 100 for the semiconductor package includes a hollowed-out portion 101 and a through hole 102.

The material of glass used for the glass substrate 100 for the semiconductor package is not particularly limited. For example, the glass substrate 100 may be soda lime glass, aluminosilicate glass, alkali-free glass, quartz, sapphire glass, crystallized glass, and the like. The glass may contain or does not have to contain a coloring component such as Ti and Cu. Preferably, the glass does not contain any coloring component.

The thickness of the glass substrate 100 for the semiconductor package is not particularly limited. For example, the thickness is in a range of 0.05 mm to 3 mm. When it is desired to reduce the thickness of the semiconductor package, the thickness of the glass substrate 100 for the semiconductor package is preferably 1 mm or less and more preferably 0.7 mm or less. When it is desired to maintain the rigidity and the dielectric characteristics of the semiconductor package, the thickness of the glass substrate 100 for the semiconductor package is preferably 0.1 mm or more and more preferably 0.2 mm or more.

When the coefficient of thermal expansion of the glass substrate 100 for the semiconductor package is $5 \cdot 10^{-6}/K$ or less in a measurement range of 5 to 200 degrees Celsius, a crack does not easily occur around a through hole during UV laser processing in a first production method explained later. The coefficient of thermal expansion is preferably $3 \cdot 10^{-6}/K$ to $15 \cdot 10^{6}/K$, because metals used for conductive traces formed on the substrate and the through holes do not easily peel off.

The dielectric tangent of the glass substrate 100 for the semiconductor package is preferably 0.006 or less at a resonance frequency of around 10 GHz. The dielectric tangent is more preferably 0.003 or less. In this case, even a semiconductor package for a radio frequency can attain a low dielectric loss, which is preferable.

The glass substrate 100 for the semiconductor package includes at least one hollowed-out portion 101. Further, the glass substrate 100 for the semiconductor package includes at least one through hole 102 around the hollowed-out portion 101. The plan view of FIG. 1 illustrates the hollowed-out portion 101 in a substantially rectangular shape. The shape of the hollowed-out portion 101 is not limited thereto, and any given shape can be selected according to the shape of the semiconductor chip to be embedded. In the plan view of FIG. 1, the glass substrate 100 for the semiconductor package includes one hollowed-out portion 101 and two through holes 102. However, the number of the hollowed-out portions 101 and the number of the through holes 102 are not limited thereto, and the glass substrate 100 for the semiconductor package may include multiple hollowed-out portions 101 and multiple through holes 102.

Hereinafter, the features of the hollowed-out portion 101 and the through hole 102 are explained with reference the cross-sectional view of FIG. 1.

As illustrated in the cross-sectional view of FIG. 1, the hollowed-out portion 101 has a shape including a narrow portion, and the hollowed-out portion 101 has an opening diameter D1 on the first principal surface and a minimum diameter D2 of an inner portion. In this case, the opening diameter D1 on the first principal surface is larger than the minimum diameter D2 of the inner portion. With this configuration, when a semiconductor chip is placed in the hollowed-out portion 101, and the hollowed-out portion 101 is filled with resin, the resin does not easily fall off from the hollowed-out portion 101. Preferably, the difference between the opening diameter D1 on the first principal surface and the minimum diameter D2 of the inner portion is 1 micrometer or more, and is more preferably 5 micrometers or more, in which case the resin can be significantly inhibited or prevented from falling off. Also, the difference between the opening diameter D1 on the first principal surface and the minimum diameter D2 of the inner portion is preferably 30 micrometers or less, more preferably 25 micrometers or less, and still more preferably 20 micrometers or less. When a semiconductor package is produced, the position of the semiconductor chip placed in the hollowed-out portion 101 is limited by the narrow portion, and the difference between D1 and D2 is a distance between the edge of the opening portion of the hollowed-out portion 101 and the body of the semiconductor chip. Therefore, when the difference between D1 and D2 is set in the above range, this inhibits or prevents an increase in the distance between the through hole 102 formed in the surrounding of the hollowed-out portion 101 and the semiconductor chip, so that the lengths of the conductive traces can be reduced, and accordingly, the electric loss can be reduced. The glass substrate 100 of which the difference between D1 and D2 is in the above range is preferable because in the production method explained above, the hollowed-out portion 101 can be separated in a shorter period of time in an etching step.

Figure 2:
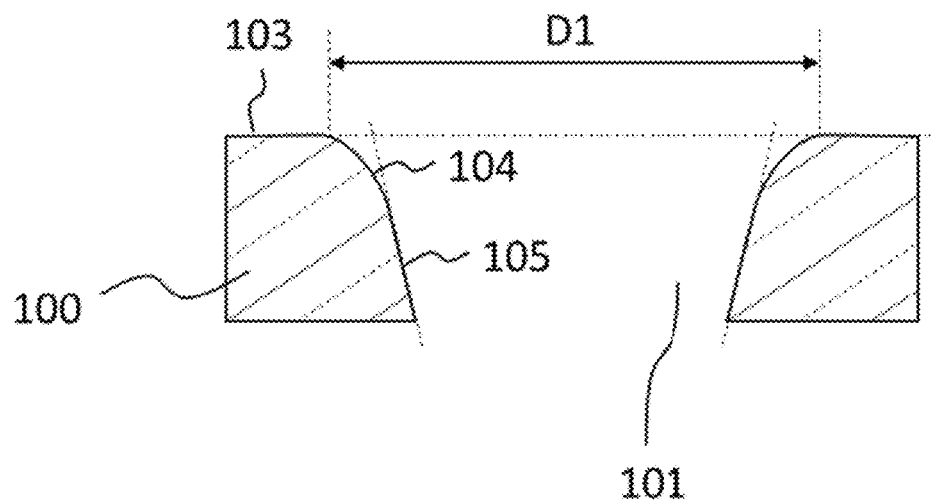
FIG. 2 is a cross-sectional view illustrating rounded shapes of a hollowed-out portion formed in a first principal surface of a glass substrate according to the first embodiment.

In this case, the opening portion on the first principal surface and the opening portion on the second principal surface of the hollowed-out portion 101 preferably have rounded shapes 104. FIG. 2 schematically illustrates a cross-sectional view of the opening portion of the hollowed-out portion 101 in the first principal surface. The rounded shape 104 means a curved surface shape that continues from a flat portion 103 of the first principal surface to a hollowed-out portion inner wall 105. The rounded shape 104 having the shape as explained above inhibits or prevents the resin, in which the semiconductor chip is embedded, from falling off, which is preferable.

Figure 3:
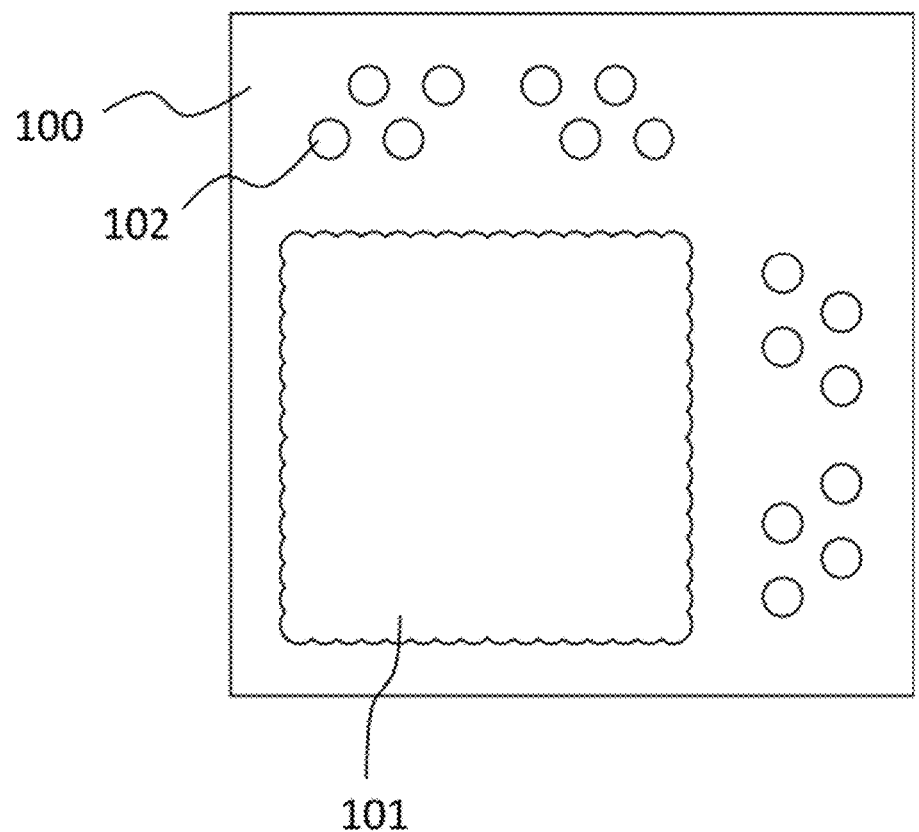
FIG. 3 is a plan view illustrating a glass substrate for a semiconductor package in which an inner wall of the hollowed-out portion includes a sawtooth shape according to the first embodiment.
Figure 4:
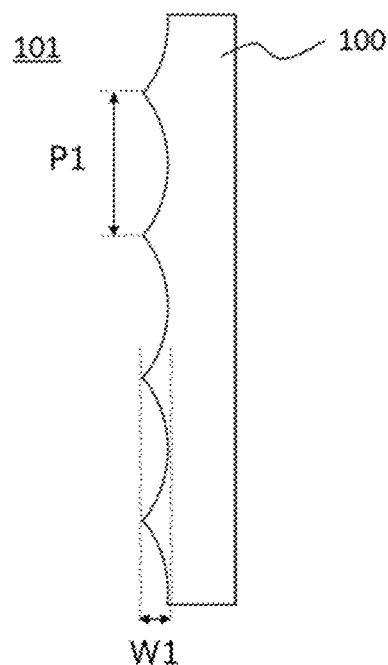
FIG. 4 is an enlarged view of the sawtooth shape according to the first embodiment.

Further, the inner wall of the hollowed-out portion 101 preferably has a sawtooth shape. FIG. 3 illustrates a plan view illustrating the hollowed-out portion 101 with its inner wall in a sawtooth shape, as seen from the first principal surface side. FIG. 4 illustrates an enlarged view of the sawtooth shape of FIG. 3. As illustrated in FIG. 3 and FIG. 4, the sawtooth shape means a shape in which groove portions in an arc shape and protruding portions are alternately arranged, each of the protruding portions being arranged between two neighboring groove portions of the groove portions in a plan view of the first principal surface. With the inner wall of the hollowed-out portion 101 having the sawtooth shape, a contact area between the inner wall of the hollowed-out portion 101 and the resin material in which the semiconductor chip is embedded increases, and the resin material is held due to the anchoring effect of the inner wall of the hollowed-out portion 101, so that the resin can be inhibited or prevented from falling off, which is preferable. The shape of the groove portion is an approximate arc, and the same effect can be obtained even if the shape is not a perfect arc.

In this case, as illustrated in FIG. 4, a repetition spacing of the sawtooth shape, i.e., a spacing between protruding portions, is denoted as P1, and a distance from the bottom of a groove portion in the arc shape to the vertex of a protruding portion is referred to as a depth W1 of the groove portion. In this case, the spacing P1 between protruding portions is preferably 15 micrometers or more and more preferably 20 micrometers or more. When the spacing between protruding portions is in the above range, the anchoring effect is more likely to occur, and the resin can be fixed.

Where an opening diameter of the through hole 102 in the first principal surface is denoted as d1, the spacing P1 between the protruding portions and the opening diameter d1 of the through hole preferably satisfies the following relational expression (1).

$$P1 < 0.8 \cdot d1 \tag{1}$$

When P1 is in the range of the expression (1), the hollowed-out portion can be readily formed in the etching step during the production explained later.

The depth W1 of the groove portion is preferably 0.5 micrometers or more and more preferably 1 micrometer or more, so that the resin can be more easily inhibited or prevented from falling off. The depth W1 of the groove portion is preferably 10 micrometers or less and more preferably 5 micrometers or less, so that the distance between the hollowed-out portion 101 and the through hole 102 can be reduced, and the electric loss can be reduced, which is preferable.

Further, the arc shape of the groove portion preferably has a curvature radius of 20 micrometers or more and 100 micrometers or less.

As illustrated in the cross-sectional view of FIG. 1, the through hole 102 may be in a shape having a narrow portion, and the through hole 102 includes the opening diameter d1 in the first principal surface and a minimum diameter d2 of an inner portion. In this case, the opening diameter d1 in the first principal surface is preferably larger than the minimum diameter d2 of the inner portion. When the through hole 102 is filled with a conductive material to form a through electrode, first, a thin film is formed on the inner wall by evaporation and dip coating, and the through electrode can be grown by electroplating and the like by using the thin film as the core. When d1>d2, a thin film serving as the core can be readily formed on the inner wall of the through hole. More preferably, the difference between the opening diameter d1 in the first principal surface and the minimum diameter d2 of the inner portion is 1 micrometer or more, and still more preferably, the difference is 5 micrometers or more, in which case the above effect can be obtained more easily. The difference between the opening diameter d1 in the first principal surface and the minimum diameter d2 of the inner portion is preferably 30 micrometers or less, more preferably 20 micrometers or less, and still more preferably 10 micrometers or less. When the difference between d1 and d2 is in the above range, the increase in the electric resistance at the narrow portion can be reduced and desired electric characteristics can be obtained in the through electrode.

In the semiconductor package, a semiconductor chip is embedded in the hollowed-out portion 101 with a resin layer having conductive traces formed thereon, and the through hole 102 is filled with a conductive material to be used as a through electrode. For this reason, the semiconductor chip is desired to be arranged at a predetermined position with a high accuracy. Therefore, the accuracy in position of arrangement of the semiconductor chip can be increased in a production step for producing the semiconductor package by increasing a relative accuracy in position of the through hole 102 and the hollowed-out portion 101 of the glass substrate 100 for the semiconductor package. In the glass substrate for the semiconductor package according to the present disclosure, the accuracy in position of the center of the opening of the hollowed-out portion 101 in the first principal surface is preferably 10 micrometers or less with reference to the center of the opening of at least one through hole chosen from the through holes 102 in the first principal surface. When the opening portion of the hollowed-out portion 101 is in an asymmetric shape, the center of gravity of the asymmetric shape of the opening portion can be adopted as the center of the opening.

Hereinafter, accuracy in position is explained. Any one of the through holes 102 formed around the hollowed-out portion 101 is selected, and where the center of the opening of the selected through hole 102 is defined as a reference coordinate Via00 (0, 0), a hollowed-out portion is formed so that the coordinate of the center of the opening of the hollowed-out portion becomes (X, Y). In this case, where the coordinate of the actually formed hollowed-out portion is (X+ΔX, Y+ΔY), the accuracy in position is defined by the following expression (2).

$$\text{(Positional accuracy)} = \sqrt{(\Delta X^2 + \Delta Y^2)} \tag{2}$$

The accuracy in position of the center of the opening of the hollowed-out portion 101 with reference to the center of the opening of the through hole 102 is 10 micrometers or less, preferably 5 micrometers or less, more preferably 2 micrometers or less, and still more preferably 1 micrometer or less.

The positional accuracies of more than half of the through holes 102 are also preferably 10 micrometers or less with reference to the reference coordinate Via00. The positional accuracies are more preferably 5 micrometers or less, still more preferably 2 micrometers or less, and still yet more preferably 1 micrometer or less.

Further, the positional accuracies of 80% or more of the through holes 102 are preferably 10 micrometers or less with reference to the reference coordinate Via00. The positional accuracies are more preferably 5 micrometers or less, still more preferably 2 micrometers or less, and still more preferably 1 micrometer or less.

Next, a production method for producing a glass substrate for a semiconductor package according to the present disclosure is explained. The production method according to the present disclosure includes preparing a glass substrate including a first principal surface and a second principal surface, emitting a laser to, on the first principal surface of the glass substrate, a through hole formation prospective position and a contour of a hollowed-out portion prospective shape, and forming a through hole and a hollowed-out portion by etching the glass substrate. In the first production method, an initial hole is formed in the laser emission step, and the initial hole is enlarged in the etching step subsequent to the laser emission step. In a second production method, a modified portion is formed instead of the initial hole in the laser emission step, and the modified portion is removed to penetrate the glass substrate to enlarge the hole in the etching step.

(First Production Method for Producing Glass Substrate for Semiconductor Package)

The first production method for explaining the glass substrate for the semiconductor package according to the present disclosure is explained. In this case, the production method is explained with reference to the glass substrate 100 for the semiconductor package as illustrated in FIG. 3, for example.

Figure 5:
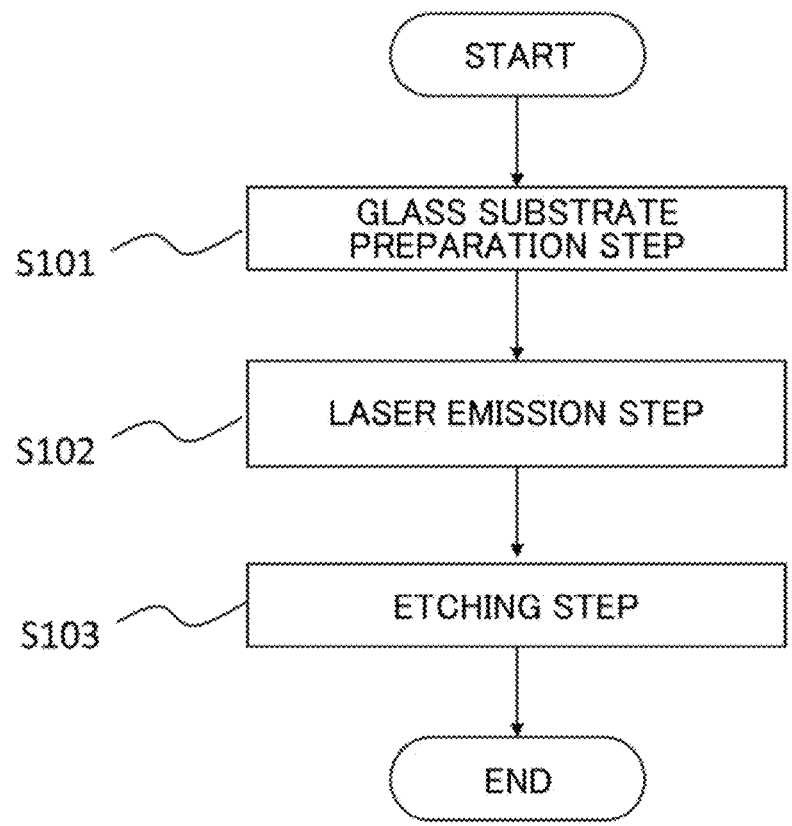
FIG. 5 is a flowchart of a first production method.

FIG. 5 illustrates a flowchart of the first production method.

The production method according to the present disclosure includes:

(S101) preparing a glass substrate having a first principal surface and a second principal surface (glass substrate preparation step);

(S102) forming an initial hole by emitting a laser to, on the first principal surface of the glass substrate, a through hole formation prospective position and a contour of a hollowed-out portion prospective shape (laser emission step);

(S103) forming the through hole by etching the glass substrate and enlarging the initial hole, and forming the hollowed-out portion by separating the hollowed-out portion prospective shape (etching step).

According to the production method of the present disclosure, forming of the through hole and forming of the hollowed-out portion can be performed in the same process, and it is not necessary to perform positioning of the through hole and the hollowed-out portion. Therefore, the glass substrate for the semiconductor package with a high accuracy in position of the hollowed-out portion with respect to the through hole can be formed. Also, with the laser emission and the etching step explained below, the diameter of the inner portion of the hollowed-out portion is less than the opening diameter of the hollowed-out portion. Therefore, the resin can be significantly inhibited or prevented from falling off when the semiconductor chip is embedded in the hollowed-out portion. Hereinafter, the details of each step are explained.

(Step S101)

First, a glass substrate having a first principal surface and a second principal surface is prepared.

The material of the glass substrate is not particularly limited. For example, the glass substrate may be soda lime glass, aluminosilicate glass, alkali-free glass, quartz, sapphire glass, crystallized glass, and the like. The glass may contain or does not have to contain a coloring component. Preferably, the glass does not contain any coloring component.

The thickness of the glass substrate is not particularly limited. For example, the thickness is in a range of 0.05 mm to 3 mm. When it is desired to reduce the thickness of the semiconductor package, the thickness of the glass substrate is preferably 1 mm or less and more preferably 0.7 mm or less. When it is desired to maintain the rigidity and the dielectric characteristics of the semiconductor package, the thickness of the glass substrate is preferably 0.1 mm or more and more preferably 0.2 mm or more.

When the coefficient of thermal expansion of the glass substrate is $5 \cdot 10^{-6}$/K or less, a crack does not easily occur around a through hole during UV laser processing in the laser emission step. The coefficient of thermal expansion is preferably $3 \cdot 10^{-6}$/K to $15 \cdot 10^{-6}$/K, because metals used for conductive traces formed on the substrate and the through holes do not easily peel off.

The dielectric tangent of the glass substrate is preferably 0.006 or less at a resonant frequency around 10 GHz. In this case, even a semiconductor package for a radio frequency can attain a low dielectric loss, which is preferable.

(Step S102)

Figure 6:
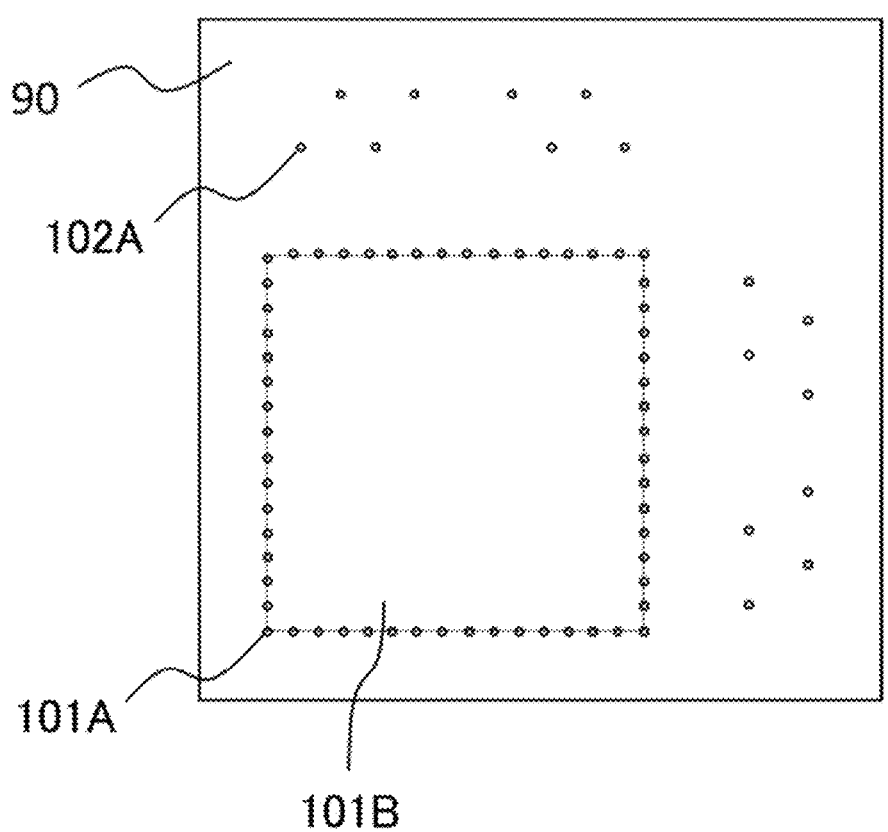
FIG. 6 is a schematic view illustrating a top surface of a glass substrate in which the initial holes are formed in the laser emission step according to the first production method.

FIG. 6 schematically illustrates the glass substrate in which the initial holes 101A, 102A are formed by laser emission in step S102. In step S102, the initial holes 102A are formed by emitting a laser to through hole formation prospective positions on the first principal surface of the glass substrate. Subsequently, the initial holes 101A are formed by emitting a laser to a contour of a hollowed-out portion prospective shape 101B on the first principal surface of the glass substrate. The order of forming the initial holes 101A, 102A is not particularly limited. The accuracy in position of the hollowed-out portions with respect to the through holes can be improved by performing these steps in succession. FIG. 6 illustrates the plurality of initial holes 102A formed at the plurality of through hole formation prospective positions and the plurality of initial holes 101A formed on the contour line of the hollowed-out portion prospective shape 101B.

Figure 7:
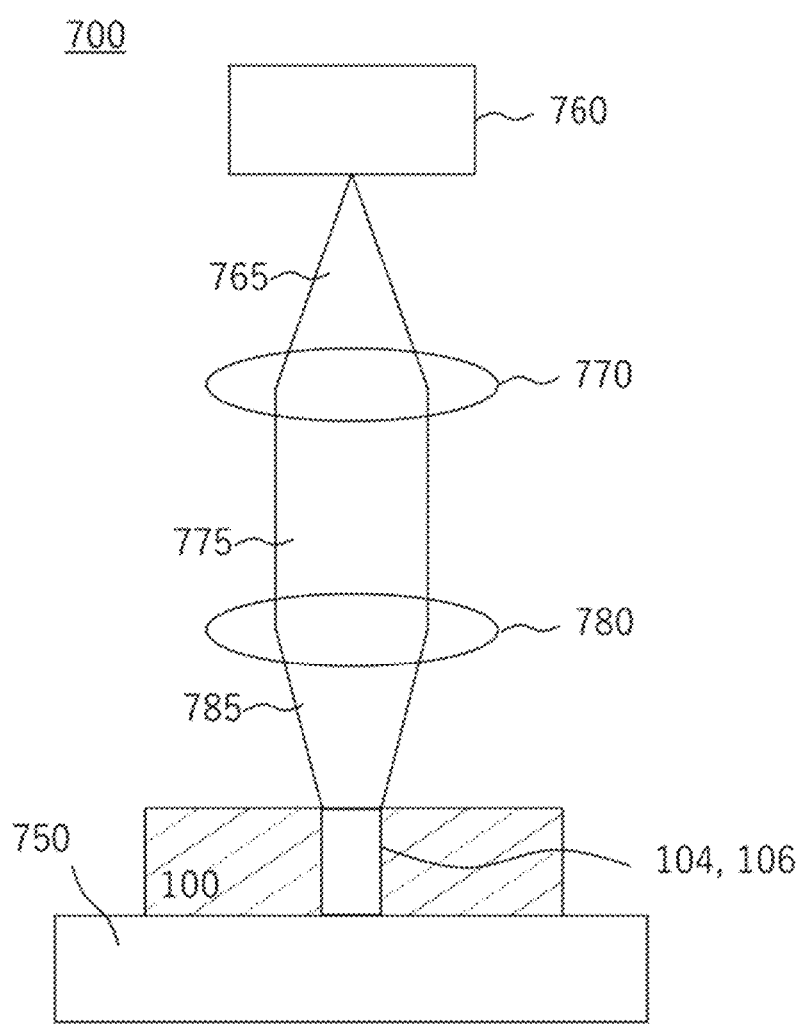
FIG. 7 is a schematic view illustrating a laser emission device used in the laser emission step according to the first production method.

Hereinafter, the details of laser emission used in step S102 and step S103 are explained. FIG. 7 schematically illustrates a device that can be used in steps S102 and S103. As illustrated in FIG. 7, the laser emission device 700 includes a stage 750, a laser oscillator 760, a beam adjustment optical system 770, a condenser lens 780, and the like.

First, on the stage 750, the glass substrate 100 is placed in such an orientation that the second principal surface faces the stage 750. Next, the laser oscillator 760 oscillates a laser beam 765. The laser beam 765 is incident upon the beam adjustment optical system 770. The beam adjustment optical system 770 adjusts the beam diameter and the beam shape of the laser beam 765 to produce a laser beam 775. For example, the beam adjustment optical system 770 is formed by a combination of a concave lens and a convex lens. The beam adjustment optical system 770 may have an aperture. The laser beam 775 is incident on the condenser lens 780. The condenser lens 780 condenses the laser beam 775 to produce a laser beam 785. The laser beam 785 is incident upon the first principal surface of the glass substrate 100 to form the first initial hole 102A in the glass substrate 100.

In this case, the center of the opening of the first initial hole 102A is defined as a reference coordinate (0, 0), and a position coordinate of another initial hole 102A is determined and formed on the basis of this reference coordinate. Further, the center coordinate of the hollowed-out portion prospective shape 101 is defined as (X, Y), and the initial hole 101A is formed with the center of the opening of the initial hole 101A being on the contour line of the hollowed-out portion prospective shape 101B. When a heating step is provided after the laser emission and before the etching, the position of the initial hole 101A is preferably designed in view of shrinkage of the glass substrate. In this manner, the initial hole 102A formed at the through hole formation prospective position and the initial hole 101A formed on the contour line of the hollowed-out portion prospective shape 101B are processed continuously in a single process of coordinate setting, so that the glass substrate 100 for the semiconductor package with a relatively high accuracy in position of the through hole 102 and the hollowed-out portion 101 can be produced.

The initial hole means a very small hole formed by laser emission. The initial hole may penetrate through the glass substrate. Alternatively, the initial hole may be closed in the glass substrate without penetrating through the glass substrate.

The wavelength of the laser beam 785 according to the present disclosure is not particularly limited. For example, when the wavelength is 3000 nanometers or less, adverse effects on the glass substrate can be alleviated, which is preferable. The wavelength of the laser beam 785 is preferably 2050 nanometers or less and more preferably 1090 nanometers or less, so that the laser has a sufficiently large energy and the initial holes can be readily formed. In the first production method, the wavelength is preferably 500 nanometers or less, and more preferably in the ultraviolet region of 400 nanometers or less, so that very small through holes can be readily formed as initial holes by a high energy level. The wavelength is generally 150 nanometers or more. In the first production method for producing the glass substrate for the semiconductor package according to the present disclosure, the laser 785 is assumed to be an ultraviolet laser with a wavelength of 400 nanometers or less.

In this case, the laser beam 785 is preferably oscillated with pulse oscillation. The pulse width of the laser beam 785 is preferably 1000 nanoseconds or less, more preferably 500 nanoseconds or less, and still more preferably 100 nanoseconds or less, so that the peak power of the laser beam per pulse can be increased, and the initial hole can be readily formed. However, when the peak power is set to a too large value, cracks will occur inside the hole. For this reason, the pulse width is preferably set to 1 nanosecond or more.

The pulse repetition frequency is preferably 1 kHz to 100 kHz and more preferably 5 kHz to 50 kHz from the viewpoint of heat storage.

The pulse energy obtained by dividing the output by the repetition frequency is preferably 5 μJ to 150 μJ and more preferably 10 μJ to 80 μJ.

Preferably, 100 to 10000 pulses are emitted to form a single initial hole 101A or 102A.

The initial holes 101A formed on the contour line of the hollowed-out portion prospective shape 101B are preferably formed so that the spacing of the initial holes 101A is 15 micrometers or more. When the spacing of the initial holes 101A is set to 15 micrometers or more, sawtooth shapes are easily generated in the hollowed-out portion 101 of the glass substrate 100 for the semiconductor package. In addition, in this case, the spacing P1 between protruding portions of the sawtooth shape can be 15 micrometers or more, and the depth W1 of the groove portion easily falls within a range of 0.5 micrometers or more and 10 micrometers or less. In addition, the spacing of the initial holes 101A being set to 15 micrometers or more can inhibit or prevent a phenomenon of failure to form a subsequent initial hole due to absorption of a laser, emitted to form the subsequent initial hole, by the previously formed initial hole, and can inhibit or prevent a phenomenon of forming a distorted shape due to joining of a subsequent initial hole and a previous initial hole. Accordingly, a phenomenon of failing to separate the hollowed-out portion 101 along the hollowed-out portion prospective shape 101B in the subsequent etching step can be inhibited or prevented. In addition, the distortion of the shape of the hollowed-out portion 101 can be alleviated, and the repetitions of the protruding portions and the groove portions of the sawtooth shape on the inner wall of the hollowed-out portion 101 can be made into a uniform shape.

When the spacing of the initial holes 101A formed on the contour line of the hollowed-out portion prospective shape 101B is wider, the number of processing holes can be reduced, and the productivity can be improved. However, when the spacing is too wide, a failure to separate the hollowed-out portion 101 along the hollowed-out portion prospective shape 101B may occur in the subsequent etching step. Therefore, the spacing of the initial holes 101A is preferably 0.8×d1 or less with respect to the opening diameter d1 of the through hole after etching in the etching step.

The initial holes 102A need to be formed at the through hole formation prospective positions in such a manner that the through holes 102 are not joined with each other in order to allow the through holes 102 to function as the through electrodes. Therefore, the spacing of the initial holes 102A is preferably 2×d1 or more with respect to the opening diameter d1 of the through hole after etching in the etching step.

The opening diameters of the initial holes 101A and 102A in the first principal surface are preferably 5 micrometers or more and 25 micrometers or less, and are more preferably 10 micrometers or more and 20 micrometers or less. As a result of the etching step performed later, a difference occurs between the opening diameter D1 of the hollowed-out portion 101 in the first principal surface and the diameter D2 of the inner portion, but if the opening diameters are set to the above range, the difference between D1 and D2 easily becomes 1 micrometer or more and 30 micrometers or less.

As a result of the above step, the initial holes 101A and 102A are formed in the glass substrate.

In this case, a step of applying heat treatment to the glass substrate may be provided between step S102 and step S103. When the glass substrate is treated in the heating treatment, a stress that occurs around the initial holes 101A due to the laser emission in step S102 can be alleviated, and the inner walls of the holes can be inhibited or prevented from being etched non-uniformly during etching in the subsequent step S10, which is preferable.

(Step S103)

Next, the glass substrate formed with the initial holes 101A and 102A is etched. The etching step is performed by methods such as immersing the glass substrate in an etching solution or spraying an etching solution to the first and second principal surfaces of the glass substrate.

When the glass substrate is immersed in the etching solution, ultrasonic waves may be applied to the etching solution. When the ultrasonic waves are applied to the etching solution, the expansion rate of the initial holes 101A and 102A can be accelerated to allow the hollowed-out portion 101 to be separated along the hollowed-out portion prospective shape 101B in a shorter period of time. The frequency of the ultrasonic waves is not particularly limited. For example, the frequency is preferably 200 kHz or less, more preferably 100 kHz or less, and still more preferably less than 40 kHz, in order to obtain the above effect. In general, ultrasonic waves with a frequency of 20 kHz or more are used.

The etching solution is not particularly limited. For example, the etching solution is a solution containing hydrofluoric acid. The etching solution may be hydrofluoric acid alone, or may contain a mixed acid with an aqueous solution of hydrochloric acid, nitric acid, or the like. The etching solution may preferably contain a mixed acid including any one of the aqueous solution of hydrochloric acid and the aqueous solution of nitric acid or including both of them, so that the etching solution can dissolve salt generated in an etching process, and that a phenomenon that the salt blocks the entrance of the initial hole can be inhibited or prevented.

The concentration of hydrogen fluoride in the etching solution is preferably 0.1 wt % or more with respect to the entire etching solution, in order to progress the etching sufficiently. The concentration of hydrogen fluoride in the etching solution is preferably 5.0 wt % or less and more preferably 3.5 wt % or less with respect to the entire etching solution in order to evenly progress the etching of the opening portion and the etching of the inner portion of the initial hole and to separate the hollowed-out portion 101 along the hollowed-out portion prospective shape 101B in a shorter period of time.

The concentration of hydrogen chloride is preferably 0.5 wt % or more and more preferably 1 wt % or more with respect to the entire etching solution, because the effect of dissolving salt can be achieved significantly when the etching solution contains hydrochloric acid. The concentration of hydrogen chloride is preferably 20 wt % or less and more preferably 15 wt % or less with respect to the entire etching solution, because the speed for removing the modified portion with hydrofluoric acid can be readily maintained.

The concentration of nitric acid is preferably 0.5 wt % or more and more preferably 1 wt % or more with respect to the entire etching solution, because the effect of dissolving salt can be achieved significantly when the etching solution contains nitric acid. The concentration of nitric acid is preferably 20 wt % or less and more preferably 15 wt % or less with respect to the entire etching solution, because the speed for removing the modified portion with hydrofluoric acid can be readily maintained.

With the etching solution configured as described above, the opening diameters of the initial holes 101A and 102A can be expanded with a high degree of roundness. Accordingly, the sawtooth shape of the inner wall of the hollowed-out portion 101 has a uniform repetition structure, and a roundness with a curvature radius of 0.1 micrometer or more and 1 micrometer or less can be readily formed at the vertexes of the protruding portions of the sawtooth shape. In addition, the variation among the through holes 102 can be reduced, which is preferable.

Accordingly, the initial holes 102A are expanded to become the through holes 102. The initial holes 101A are expanded, so that neighboring initial holes 101A are connected to separate the hollowed-out portion 101 along the hollowed-out portion prospective shape 101B, and as a result, the hollowed-out portion 101 is formed. According to the steps explained above, the glass substrate 100 for the semiconductor package is produced.

(Second Production Method for Producing Glass Substrate for Semiconductor Package)

Figure 8:
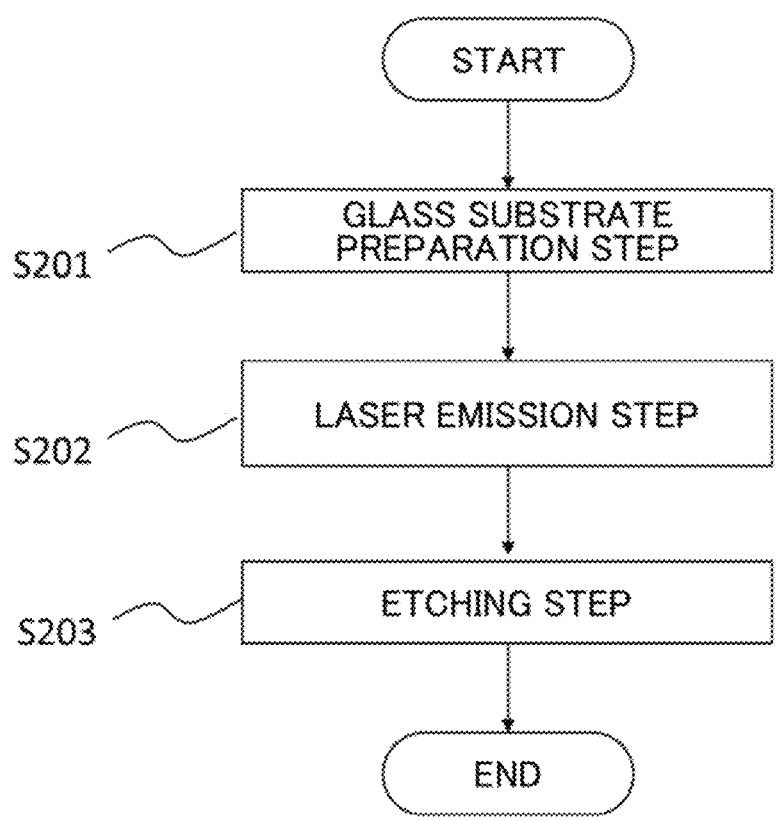
FIG. 8 is a flowchart of a flow of the second production method.

FIG. 8 illustrates a flowchart of a flow of the second production method. In the second production method, a modified portion is formed instead of the initial hole in the laser emission step. The modified portion means a portion where the structure of glass is changed by laser emission. In the method of forming such a modified portion, the diameter of the through hole 102 can be reduced. In addition, the inner wall of the hollowed-out portion 101 is relatively smooth. The sawtooth shape is not formed on the inner wall of the hollowed-out portion 101, or the spacing between protruding portions is as narrow as several micrometers or less, so that a sawtooth shape with a shallow depth is formed. Hereinafter, difference from the first production method is explained.

(Step S201)

First, like the first production method, a glass substrate is prepared.

(Step S202)

Next, a laser emission step is performed.

In the second production method, a wavelength with a high transmittance for the glass substrate is selected for the laser beam 785, so that the modified portion can be formed instead of the initial hole by laser emission. The wavelength of the laser beam 785 is preferably 300 nanometers to 1100 nanometers.

In the second production method, the pulse width is preferably 1 nanosecond or less, more preferably 500 picoseconds or less, still more preferably 100 picoseconds or less, so that the modified portion can be readily formed. The pulse width is preferably 1 picosecond or more.

The laser beam 785 is preferably a burst-pulse laser. A burst pulse is a group of multiple pulses of which the pulse spacing is extremely short. With the burst pulse, a large pulse energy can be given to the processing target in a short period of time. In this case, each pulse width in the burst pulse is preferably 1 picosecond or more and 100 picoseconds or less, the pulse spacing within the burst pulse is preferably 1 nanosecond or more and 50 nanoseconds or less, and the spacing in the burst pulse is preferably several microseconds.

The laser beam 785 is condensed on the condenser lens 780, and a linearly focused area (i.e., a focal line) preferably exists from the first principal surface via the inner portion to the second principal surface of the glass substrate. The beam adjustment optical system 770 that produces such a focal line preferably includes a lens having spherical aberration or an axicon lens.

When the spacing of the modified portion formed on the contour line of the hollowed-out portion prospective shape 101B is preferably 10 micrometers or less and more preferably 5 micrometers or less, the hollowed-out portion 101 can be readily separated. The spacing of the modified portion is preferably 1 micrometer or more.

According to such a configuration, the modified portion is formed in the glass substrate. Upon applying, in a manner similar to the first production method, the etching step S203 to the glass substrate formed with the modified portion, the glass substrate 100 for the semiconductor package is produced.

EXAMPLES

Example 1

A glass substrate for a semiconductor package according to the first embodiment was produced according to the first production method explained above.

First, a glass substrate made of alkali-free glass with a thickness of 0.6 mm was prepared. The glass did not include a coloring component.

Next, the glass substrate was placed on a stage of a laser device so that the second principal surface faced the stage. A laser was emitted to the first principal surface of the glass substrate, so that initial holes were formed at the through hole formation prospective positions and on the contour line of the hollowed-out portion prospective shape. With the use of the laser with a laser wavelength of 355 nanometers and a pulse width of 20 nanoseconds, 1500 pulses were emitted with a pulse energy of 50 µJ to form a single initial hole. Where the reference coordinate of the first initial hole was defined as (0, 0), the coordinate of the center of the hollowed-out portion prospective shape was set as (4.0 mm, 3.75 mm), and the spacing of initial holes on the contour line of the hollowed-out portion prospective shape was set as 15 micrometers.

Next, the glass substrate was immersed in the etching solution to perform etching. The etching solution was a mixed acid solution including 1 wt % of hydrofluoric acid and 2 wt % of hydrochloric acid. The immersion time was 130 minutes. Immediately after the immersion, the etching was stopped by immersing the glass substrate in pure water. As a result of the etching step, the plate thickness of the glass substrate decreased by 32 micrometers. Hereinafter, the amount of decrease in the plate thickness may be referred to as an "etching amount".

Figure 9:
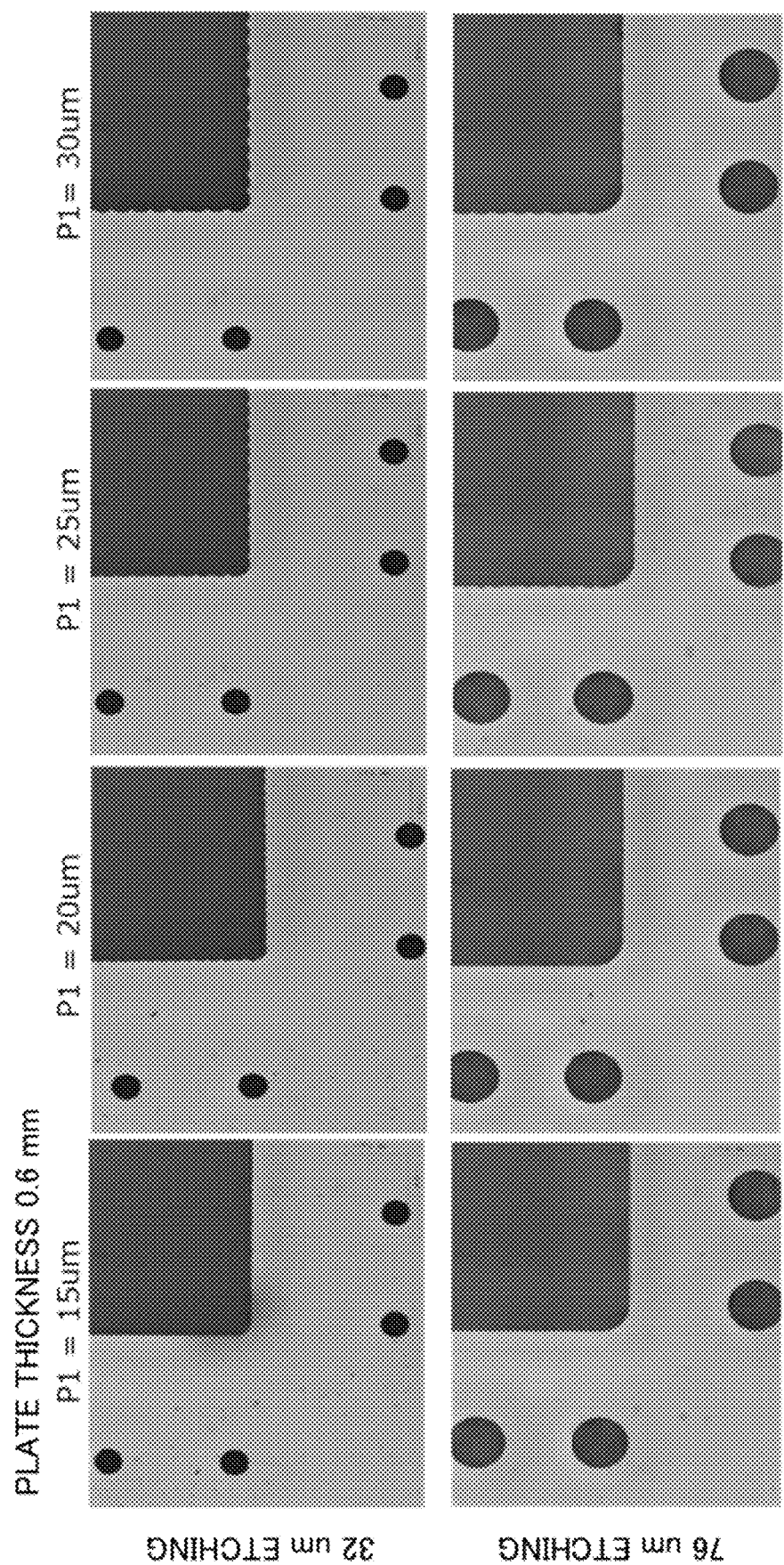
FIG. 9 illustrates top views of Examples.
Figure 10:
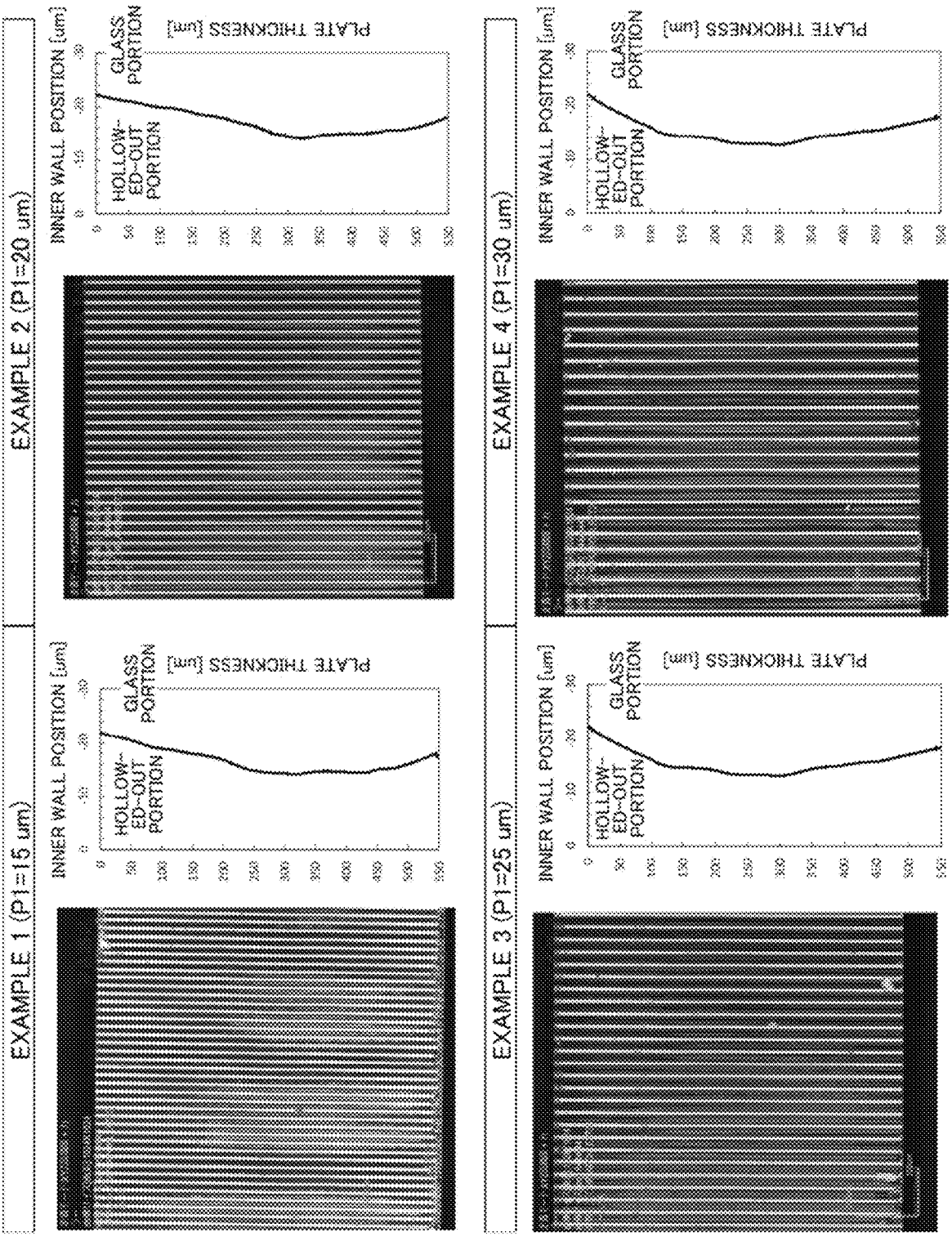
FIG. 10 illustrates cross-sectional view of Examples.

According to the above steps, the glass substrate having the through holes and the hollowed-out portion for the semiconductor package was produced. Table 1 shown below summarizes processing conditions, the difference D1-D2 between the opening diameter D1 of the processed hollowed-out portion and the minimum diameter D2 of the inner portion, the opening diameter d1 of the through hole in the first principal surface, the accuracy in position of the center of the opening of the hollowed-out portion in the first principal surface with respect to the center of the opening of a reference through hole, the spacing P1 between protruding portions of the sawtooth shape on the first principal surface, and the depth W1 of the groove portion. In Table 1, Examples 1 to 24 are referred to as Ex. 1 to Ex. 24, respectively. FIG. 9 illustrates images taken from above on the processed first principal surface side. FIG. 10 illustrates images of the hollowed-out portion inner walls taken from a direction perpendicular to the inner wall, and measurement results of cross-sectional shapes of the hollowed-out portions. It can be understood from the captured images illustrated in FIG. 9 and FIG. 10 that the inner walls of the hollowed-out portions had sawtooth shapes. Also, it can be understood from the measurement results of the cross-sectional shapes that the hollowed-out portions were narrowed.

Examples 2 to 8

In Examples 2 to 8, experiments were conducted by changing the spacing of initial holes on the contour line and the amount of etching but using parameters similar to Example 1 for conditions other than the above. The results of the experiments are shown in Table 1, FIG. 9, and FIG. 10.

Examples 9 to 24

Figure 11:
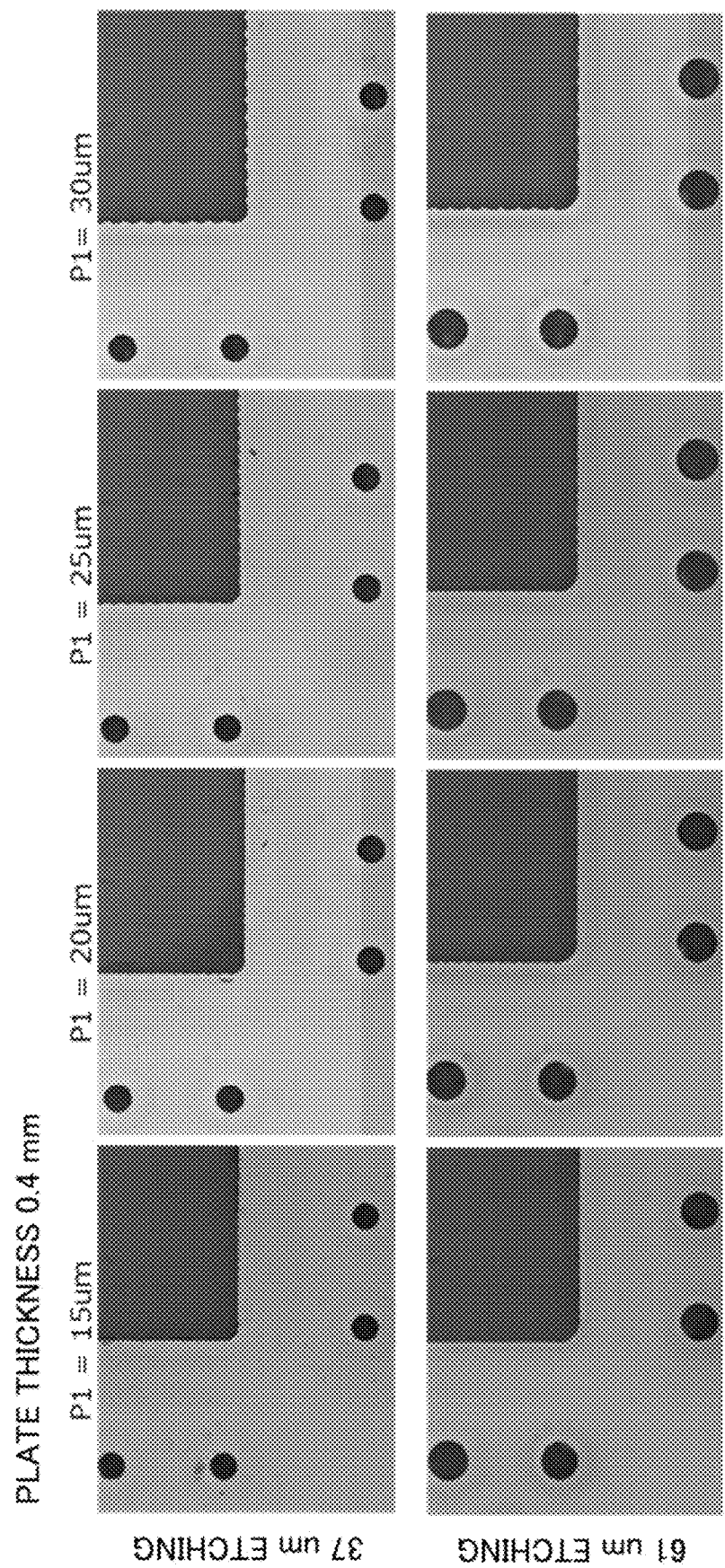
FIG. 11 illustrates top views of Examples.
Figure 12:
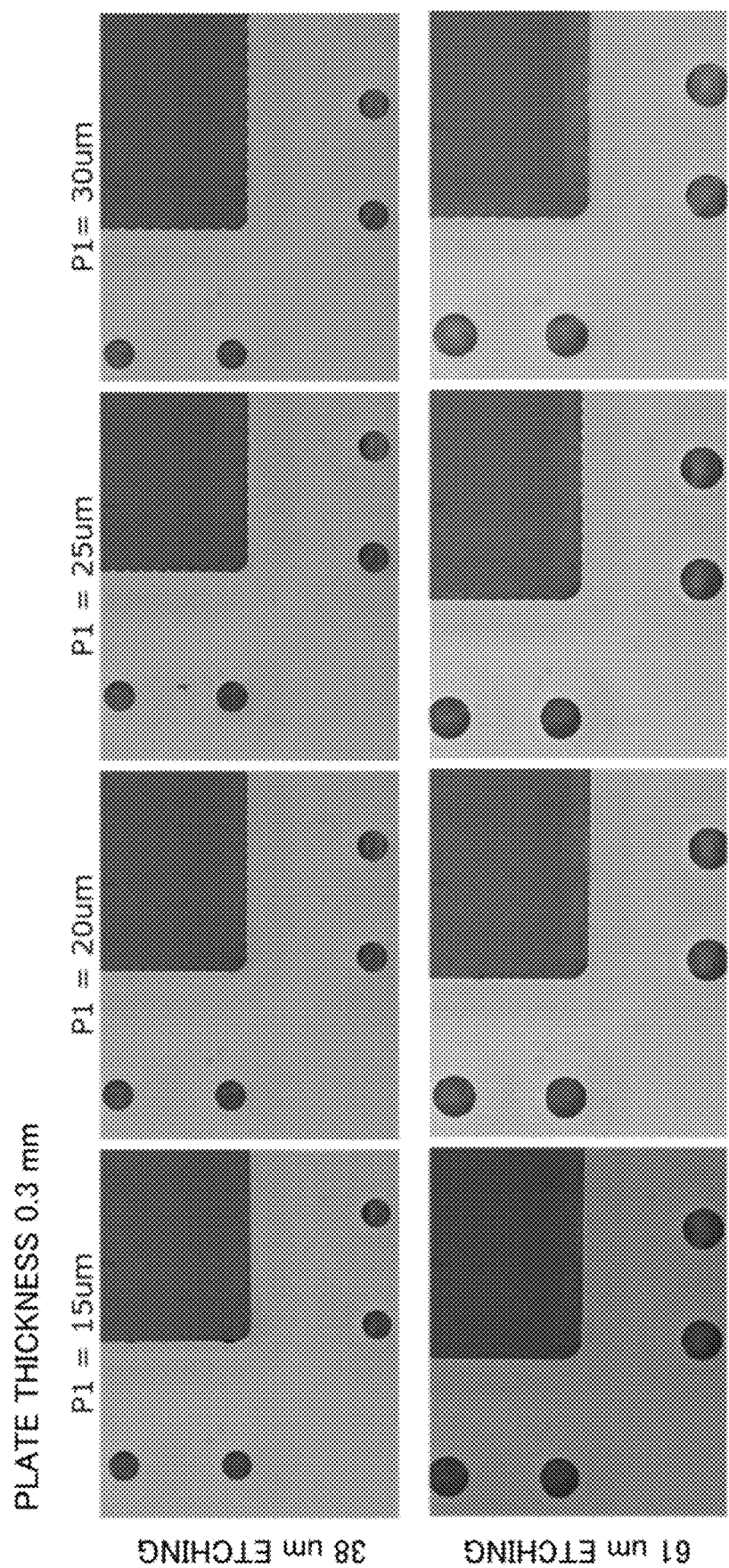
FIG. 12 illustrates top views of Examples.

In Examples 9 to 24, experiments were conducted by changing not only the spacing of initial holes and the amount of etching but also the plate thickness. The results of the experiments are shown in Table 1, FIG. 11, and FIG. 12.

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Plate thickness [mm] |  |  |  | 0.6 |  |  |  |  |
| Amount of etching [μm] |  |  | 32 |  |  |  | 76 |  |
| Initial hole interval on contour line [μm] | 15 | 20 | 25 | 30 | 15 | 20 | 25 | 30 |
| P1 [μm] | 15 | 20 | 25 | 30 | 15 | 20 | 25 | 30 |
| W1 [μm] | 2.1 | 3.5 | 4.9 | 6.6 | 1.3 | 1.8 | 2.8 | 3.2 |
| D1-D2 [μm] | 15.6 | 16.6 | 18.4 | 18.6 | N.D | N.D | N.D | N.D |
| d1 [μm] | 43.4 | 44.8 | 44.6 | 44.0 | 89.7 | 91.8 | 93.4 | 93.2 |
| ΔX2 [μm] | −0.4 | 0.5 | 0.7 | 0.1 | −0.7 | −0.3 | −0.2 | 0.3 |
| ΔY2 [μm] | 1.3 | 0.5 | 0.7 | −0.3 | 0.7 | 0.2 | −0.8 | −0.6 |
| Accuracy in position [μm] | 1.4 | 0.71 | 0.99 | 0.32 | 0.99 | 0.36 | 0.82 | 0.67 |
|  | Ex. 9 | Ex. 10 | Ex. 11 | Ex. 12 | Ex. 13 | Ex. 14 | Ex. 15 | Ex. 16 |
| Plate thickness [mm] |  |  |  | 0.4 |  |  |  |  |
| Amount of etching [μm] |  |  | 37 |  |  |  | 61 |  |
| Initial hole interval on contour line [μm] | 15 | 20 | 25 | 30 | 15 | 20 | 25 | 30 |
| P1 [μm] | 15 | 20 | 25 | 30 | 15 | 20 | 25 | 30 |
| W1 [μm] | 1 | 1.5 | 2.8 | 3.6 | 0.9 | 1 | 1.8 | 3.2 |
| d1 [μm] | 47.3 | 48.7 | 49.4 | 49.9 | 71 | 72.4 | 70.6 | 74.7 |
| ΔX2 [μm] | 0.4 | 1.6 | 1.4 | 0.4 | 0.9 | −0.1 | −0.4 | 0.2 |
| ΔY2 [μm] | 0.1 | 0.6 | 0.2 | 1.1 | 1.5 | 0.9 | 0.5 | 0.7 |
| Accuracy in position [μm] | 0.41 | 1.71 | 1.41 | 1.17 | 1.75 | 0.91 | 0.64 | 0.73 |
|  | Ex. 17 | Ex. 18 | Ex. 19 | Ex. 20 | Ex. 21 | Ex. 22 | Ex. 23 | Ex. 24 |
| Plate thickness [mm] |  |  |  | 0.3 |  |  |  |  |
| Amount of etching [μm] |  |  | 38 |  |  |  | 61 |  |
| Initial hole interval on contour line [μm] | 15 | 20 | 25 | 30 | 15 | 20 | 25 | 30 |
| P1 [μm] | 15 | 20 | 25 | 30 | 15 | 20 | 25 | 30 |
| W1 [μm] | 1.1 | 1.3 | 2.7 | 3.4 | 1.4 | 1.1 | 1.9 | 2.6 |
| d1 [μm] | 48.6 | 48.9 | 52.4 | 51.3 | 71.2 | 72.3 | 73 | 15.5 |
| ΔX2 [μm] | 0.3 | −0.1 | −0.1 | 0.1 | −0.2 | −0.4 | −0.5 | 0 |
| ΔY2 [μm] | −0.5 | −0.8 | −0.4 | −0.1 | 0.1 | −0.7 | −0.4 | 0 |
| Accuracy in position [μm] | 0.58 | 0.81 | 0.41 | 0.14 | 0.22 | 0.81 | 0.64 | 0.00 |

Example 25

Using glass similar to Example 1, modified portions were formed by emitting a pulsed laser with a laser wavelength of 532 nanometers, a pulse width of 10 picoseconds, and an output of 30 W. A single pulsed laser is emitted to form a single modified portion. The spacing of the modified portions was 3 micrometers. Thereafter, etching was performed with conditions similar to the Example 1. According to the above steps, the through holes and the hollowed-out portions were formed. The hollowed-out portions and the through holes thus formed had narrow portions formed therein, and the difference D1-D2 between the opening diameter D1 of the hollowed-out portion in the first principal surface and the minimum diameter D2 of the inner portion of the hollowed-out portion was 20 micrometers. It should be noted that the sawtooth shape was not formed on the hollowed-out portion inner wall.

Comparative Example 1

Figure 13:
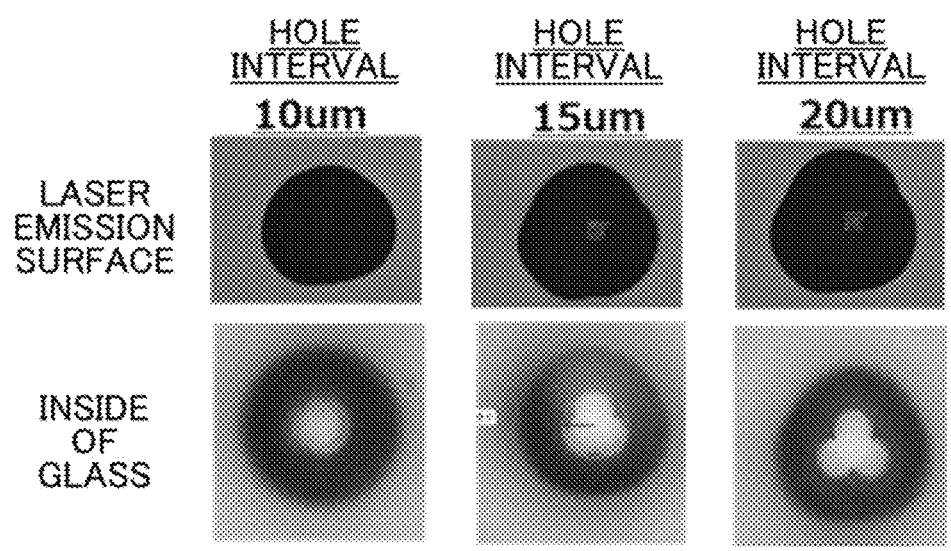
FIG. 13 illustrates top views of Examples.

Using glass similar to Example 1, an experiment was conducted with a laser similar to Example 1 and by setting the spacing of initial holes on the contour line of the hollowed-out portion prospective shape to 10 micrometers. For conditions other than the above, parameters similar to Example 1 were used. As a result of the experiment, the hollowed-out portion could not be separated. This is considered to be because neighboring initial holes were connected during laser emission, and the initial holes could not be formed uniformly on the contour line. FIG. 13 illustrates three initial holes formed in the glass substrate by emitting a laser similar to Example 1 with a spacing of 10 micrometers, 15 micrometers, and 20 micrometers. As illustrated in FIG. 13, it can be understood that, when the spacing of initial holes was 10 micrometers or less, three initial holes were connected to form a single hole.

Comparative Example 2

Using glass similar to Example 1, modified portions were formed by emitting burst-pulse laser to the contour of the hollowed-out portion prospective shape with a laser wavelength of 532 nanometers. Each pulse width within a single burst of pulses was 10 picoseconds, a single burst of pulses included two pulses, and the energy of a single burst of pulses was 185 μJ. The spacing of the modified portions was 2 micrometers. Next, the hollowed-out portion was separated by continuously oscillating and emitting $CO_2$ laser at 50 watts to the contour line formed with the modified portion. In the obtained sample, neither a narrow portion nor a sawtooth shape was present.

(Experiment of Falling Off of Resin Material)

Using samples made with the same condition as Example 1, Example 25, and Comparative Example 2, an experiment was conducted to determine whether resin material falls off. In the experiment, the shape of the hollowed-out portion was a substantially square shape with a size of 50 mm×50 mm. The hollowed-out portion thus formed was filled with a resin material and the resin material was cured. The resin material fills so that the resin material is of the same height as the principal surface of the glass substrate. Next, the glass substrate was placed on a test stage. The test stage was formed with a hole having the same shape as the hollowed-out portion, and the glass substrate was placed so that the hole and the hollowed-out portion overlapped with each other. Next, a metal square bar with a substantially square cross section with a size of 35 mm×35 mm was prepared. The corners of the square bar were rounded. The square bar was pushed into the resin so that the surface of the square bar was parallel to the surface of the resin. The pushing force was gradually increased, and the pushing force was measured when the resin falls off or when the glass breaks. Table 2 shown below summarizes results of the test.

TABLE 2

| | Narrow portion | Sawtooth Shape | Resistance against falling off of resin |
|---|---|---|---|
| Example 1 | Yes | Yes | Excellent |
| Example 25 | Yes | No | Good |
| Comparative Example 2 | No | No | Poor |

Although the embodiment has been hereinabove described, the technique of the present disclosure is not limited to the above embodiment. Various modifications and improvements such as combination or replacement of features described in the embodiment can be made with the present disclosure.

What is claimed is:

1. A glass substrate for a semiconductor package, comprising:
   a first principal surface;
   a second principal surface;
   at least one hollowed-out portion; and
   a plurality of through hole formed in a surrounding of the at least one hollowed-out portion,
   wherein in a section of the plurality of hollowed-out portion taken in a direction perpendicular to the first principal surface, a minimum diameter of the plurality of hollowed-out portion is smaller than an opening diameter of the plurality of hollowed-out portion at each of the first principal surface and the second principal surface,
   wherein an inner wall of the plurality of hollowed-out portion has a sawtooth shape,
   wherein in a plan view of the first principal surface, the sawtooth shape has a shape in which groove portions in an arc shape and protruding portions are arranged alternately, each of the protruding portions being arranged between two neighboring groove portions of the groove portions, and
   wherein where a spacing, on the first principal surface, between the two neighboring protruding portions of the protruding portions of the sawtooth shape is denoted as P1, and an opening diameter of the plurality of through hole is denoted as d1, an expression P1<0.8−d1 is satisfied.

2. The glass substrate for the semiconductor package according to claim 1, wherein a difference between the minimum diameter of the plurality of hollowed-out portion and the opening diameter of the plurality of hollowed-out portion at the first principal surface is 1 micrometer or more and is 30 micrometers or less.

3. The glass substrate for the semiconductor package according to claim 1, wherein in the section of the plurality of hollowed-out portion taken in the direction perpendicular to the first principal surface, an opening portion of the plurality of hollowed-out portion in the first principal surface has a rounded shape.

4. The glass substrate for the semiconductor package according to claim 1, wherein a spacing P1, on the first principal surface, between the two neighboring protruding portions of the protruding portions of the sawtooth shape is 15 micrometers or more.

5. The glass substrate for the semiconductor package according to claim 1, wherein a depth W1, on the first principal surface, of plurality of the groove portions of the sawtooth shape is 0.5 micrometers or more and 10 micrometers or less.

6. The glass substrate for the semiconductor package according to claim 1, wherein the plurality of through hole comprises a plurality of through holes, with reference to a center of an opening of any one through hole selected from the plurality of through holes, an accuracy in position of a center of an opening of the plurality of hollowed-out portion in the first principal surface is 10 micrometers or less.

* * * * *